(12) United States Patent
De Angelis et al.

(10) Patent No.: US 10,167,221 B2
(45) Date of Patent: Jan. 1, 2019

(54) PREFINING APPARATUS FOR CONDITIONING GLASSES

(71) Applicant: CORNING INCORPORATED, Corning, NY (US)

(72) Inventors: Gilbert De Angelis, Lindley, NY (US); David Posada-Pineda, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 62 days.

(21) Appl. No.: 15/328,254

(22) PCT Filed: Jul. 17, 2015

(86) PCT No.: PCT/US2015/040822
§ 371 (c)(1),
(2) Date: Jan. 23, 2017

(87) PCT Pub. No.: WO2016/014347
PCT Pub. Date: Jan. 28, 2016

(65) Prior Publication Data
US 2017/0217812 A1   Aug. 3, 2017

Related U.S. Application Data

(60) Provisional application No. 62/026,797, filed on Jul. 21, 2014.

(51) Int. Cl.
*C03B 5/20* (2006.01)
*C03B 5/26* (2006.01)
(Continued)

(52) U.S. Cl.
CPC .............. *C03B 5/20* (2013.01); *C03B 5/225* (2013.01); *C03B 5/2356* (2013.01); *C03B 5/26* (2013.01)

(58) Field of Classification Search
CPC ........... C03B 5/18–5/1875; C03B 5/20–5/225; C03B 5/26–5/265; C21C 2300/04
See application file for complete search history.

(56) References Cited

U.S. PATENT DOCUMENTS

| 3,260,587 A | 7/1966 | Dolf et al. |
| 3,819,350 A * | 6/1974 | Pellett .................... C03B 3/005 65/134.9 |

(Continued)

FOREIGN PATENT DOCUMENTS

| WO | 9116715 A1 | 10/1991 |
| WO | 2013011837 A1 | 1/2013 |
| WO | 2014008046 A1 | 1/2014 |

OTHER PUBLICATIONS

Němec, L., & Cincibusová, P. (2005). The bubble distribution in glass refining channels. Ceramics—Silikáty, 49(4), 269-277.

*Primary Examiner* — Lisa L Herring
(74) *Attorney, Agent, or Firm* — Ryan T. Hardee

(57) ABSTRACT

A prefiner (28) is described and includes a chamber (34) for receiving molten glass exiting a submerged combustion melter. The prefiner (28) also includes a foam breaker (36) and an exit conduit (38). The molten glass holding chamber includes a top portion (42), a bottom portion (40), and an enclosing sidewall (44). The top portion (42) includes an opening to accommodate the foam breaker (36), which is positioned to break the glass bubbles within the chamber. The exit conduit (38) resides within the chamber (34) and is in fluid communication with an outlet (68) in the sidewall (44). The exit conduit (38) is positioned to permit molten glass to flow from the lower section of the chamber to the outlet (68) and to the next stage of processing, typically a finer.

13 Claims, 2 Drawing Sheets

(51) Int. Cl.
 *C03B 5/225* (2006.01)
 *C03B 5/235* (2006.01)

(56) References Cited

U.S. PATENT DOCUMENTS

| | | | |
|---|---|---|---|
| 4,545,800 A | | 10/1985 | Won et al. |
| 4,634,461 A | | 1/1987 | Demarest, Jr. et al. |
| 4,919,700 A | * | 4/1990 | Pecoraro ................. C03B 5/20 |
| | | | 65/134.2 |
| 5,550,857 A | * | 8/1996 | Richards ................. C03B 5/005 |
| | | | 373/27 |
| 6,854,290 B2 | | 2/2005 | Hayes et al. |
| 7,273,583 B2 | | 9/2007 | Rue et al. |
| 2004/0056026 A1 | | 3/2004 | Jakes et al. |
| 2005/0236747 A1 | * | 10/2005 | Rue ....................... C03B 5/2356 |
| | | | 266/217 |
| 2008/0276652 A1 | | 11/2008 | Bauer et al. |
| 2009/0022991 A1 | | 1/2009 | Deleplace et al. |
| 2009/0038342 A1 | * | 2/2009 | Pitbladdo ................ C03B 5/187 |
| | | | 65/27 |
| 2009/0217709 A1 | * | 9/2009 | Adelsberg ............... C03B 5/027 |
| | | | 65/355 |
| 2013/0086951 A1 | | 4/2013 | Charbonneau et al. |
| 2013/0086952 A1 | | 4/2013 | Charbonneau et al. |
| 2013/0283861 A1 | | 10/2013 | Mobley et al. |
| 2014/0090419 A1 | | 4/2014 | Charbonneau et al. |
| 2014/0090422 A1 | | 4/2014 | Charbonneau et al. |
| 2014/0090423 A1 | | 4/2014 | Charbonneau et al. |
| 2014/0144185 A1 | | 5/2014 | Shock et al. |
| 2014/0245793 A1 | * | 9/2014 | Howse ................. C03B 5/2252 |
| | | | 65/134.2 |

* cited by examiner

PREFINING APPARATUS FOR CONDITIONING GLASSES

CROSS-REFERENCE TO RELATED APPLICATIONS

This application claims the benefit of priority under 35 U.S.C. § 371 of International Patent Application Serial No. PCT/US15/40822, filed on Jul. 17, 2015, which in turn, claims the benefit of priority of U.S. Provisional Patent Application Ser. No. 62/026,797 filed on Jul. 21, 2014, the contents of each of which are relied upon and incorporated herein by reference in their entireties.

BACKGROUND

The present disclosure relates generally to glass melting strategies and technologies, and more particularly, to an apparatus for treating molten glass exiting a submerged combustion melter that may be utilized before a finer.

Submerged combustion melting serves as an alternative to conventional glass melting. In submerged combustion melting, a mixture of fuel and oxidant is injected into the glass bath, resulting in combustion within the melt. Better melting rates than those typically found in conventional melters can be attained as a result of enhanced mixing and heat transfer in the bath.

One drawback of submerged combustion melting is that combustion gases are present within the melt as a result of submerged combustion. The large amount of gases in the melt, in conjunction with its agitated motion and interactions with the flame, can result in a glass melt that contains abundant gas bubbles having a wide distribution of sizes and quantities that can be orders of magnitude larger than those found in a conventional melter.

The dynamics of conventional submerged combustion processes can also result in a significantly perturbed melt free surface. Combustion gases expand and rise in the melt until they emerge at the free surface and leave the melter through the exhaust. One of the consequences of these perturbations is that the body of the melter is subjected to significant level of mechanical vibrations, which can be transmitted to the downstream processes. Also, these perturbations can create oscillations in the glass level that can translate into variations in the exiting glass flow rate.

These bubbles in the melt, vibrations of the melter, and variations in the exiting flow rate can constitute design challenges for glass fining steps downstream of the melter. The use of a conventional finer design attached to a submerged combustion melter is generally inadequate to solve the aforementioned design challenges. For example, a conventional finer would not be able to handle the excessive amount of gases in the melt or the associated foam that forms as gas bubbles rise to the glass free surface. Chemical fining can conventionally be used to address these issues; however, the effectiveness of chemical fining is limited since individual bubble growth while smaller, is more numerous creating foamy glass. Also, glass flow control can become much more difficult due to the two-phase nature of the foamy glass. As a consequence of these limitations, the use of submerged combustion melting has been constrained to applications with relatively low quality requirements (e.g., blister content).

When considering the use of submerged combustion melting for applications with high quality requirements, such as display and PV (photovoltaic) glasses, it is necessary to implement fining strategies that can address the large amount of gas bubbles and their wide size distribution. Thus, there is a need in the art for an improved submerged combustion melter and prefining mechanism.

BRIEF SUMMARY

One embodiment of the present disclosure provides a prefiner that includes a chamber for receiving molten glass exiting a submerged combustion melter. The prefiner also includes a foam breaker and an exit conduit. The molten glass holding chamber includes a top portion, a bottom portion, and an enclosing sidewall. The top portion includes an opening to accommodate the foam breaker, which is positioned to break the glass bubbles within the chamber. The exit conduit resides within the chamber and is in fluid communication with an outlet in the sidewall. The exit conduit is positioned to permit prefined molten glass to flow from the lower section of the chamber to the outlet and to the next stage of processing, typically a finer.

The present disclosure serves to condition the foamy glass exiting a submerged combustion melter so that it can be effectively treated in a conventional finer. The present disclosure includes tools for the management of the free surface foam that the emerging gases form, making it adequate for the effective separation of most of the gases in a foamy glass.

In another embodiment of the present disclosure, a prefiner may be designed to isolate the equipment downstream of the melter from the mechanical vibrations associated with submerged combustion. The present disclosure may also attenuate the flow rate variations associated with submerged combustion melting, resulting in stable and controllable glass flow rates entering the conventional fining step.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
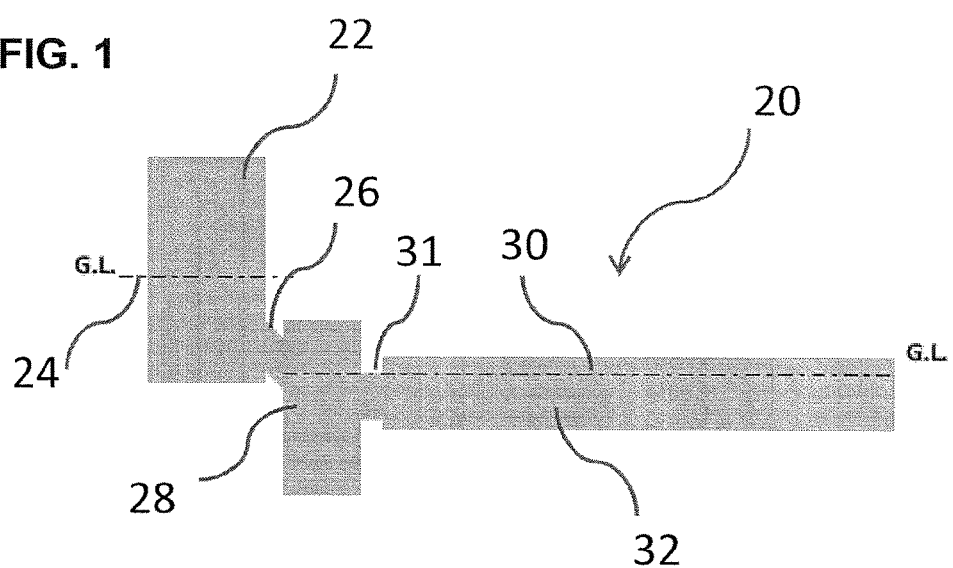
FIG. 1 is an elevated side view of a glass melting system utilizing the prefiner of the present disclosure.

Reference will now be made in detail to embodiments of the present disclosure, examples of which are illustrated in the accompanying drawings. Whenever possible, the same reference numerals will be used throughout the drawings to refer to the same or like parts.

The principle of operation of some embodiments may be the use of Stokes rise for the separation of gases from the glass melt. In such embodiments, exiting foamy glass from a submerged combustion melter may be poured at the free surface of an exemplary prefiner, and can flow downward at a low speed to allow the rise of bubbles within the melt by the Stokes rise effect. Separated bubbles can emerge at the air/glass interface and accumulate into glass foam, which may be broken with the aid of a foam breaker. The downward glass flow can be heated in an exemplary prefiner to lower the viscosity of the melt and facilitate the gas rise. The prefined glass enters an exit conduit, which can connect to an exemplary finer, at a lower section within the prefiner where no or minimal foam will enter the exit conduit.

FIG. 1 is an elevated side view of a glass melting system 20 utilizing the prefiner 28 of the present disclosure. With reference to FIG. 1, the glass melting system 20 includes a conventional submerged combustion melter 22. Submerged combustion melters are well known in the art and any such combustor may be utilized in the present disclosure. The submerged combustion melter 22 may be connected to the prefiner 28 through a melter conduit 26. The prefiner 28 may be positioned relatively lower than the submerged combustion melter 22 such that the melter conduit 26 may be angled downwardly from a lower section of the submerged combustion melter 22 to the prefiner 28. In turn, the prefiner 28 can be connected to the finer 32 through the finer conduit 31.

As shown in FIG. 1, the glass level 24 of the submerged combustion melter 22 may be above the glass level 30 of the prefiner 28 and finer 32.

As explained in further detail below, the melter conduit 26 can permit the downward flow of molten glass from the submerged combustion melter 22 at a coarsely controlled rate due to its high void fraction. The melter conduit 26 may be connected to the prefiner 28 in a non-rigid engagement to isolate the prefiner 28 from any vibrations in the submerged combustion melter 22. The melter conduit 26 may also be housed in a non-rigid enclosure to minimize or control the effect of the surroundings on the internal atmosphere of the prefiner 28, and/or to minimize heat losses.

Figure 2:
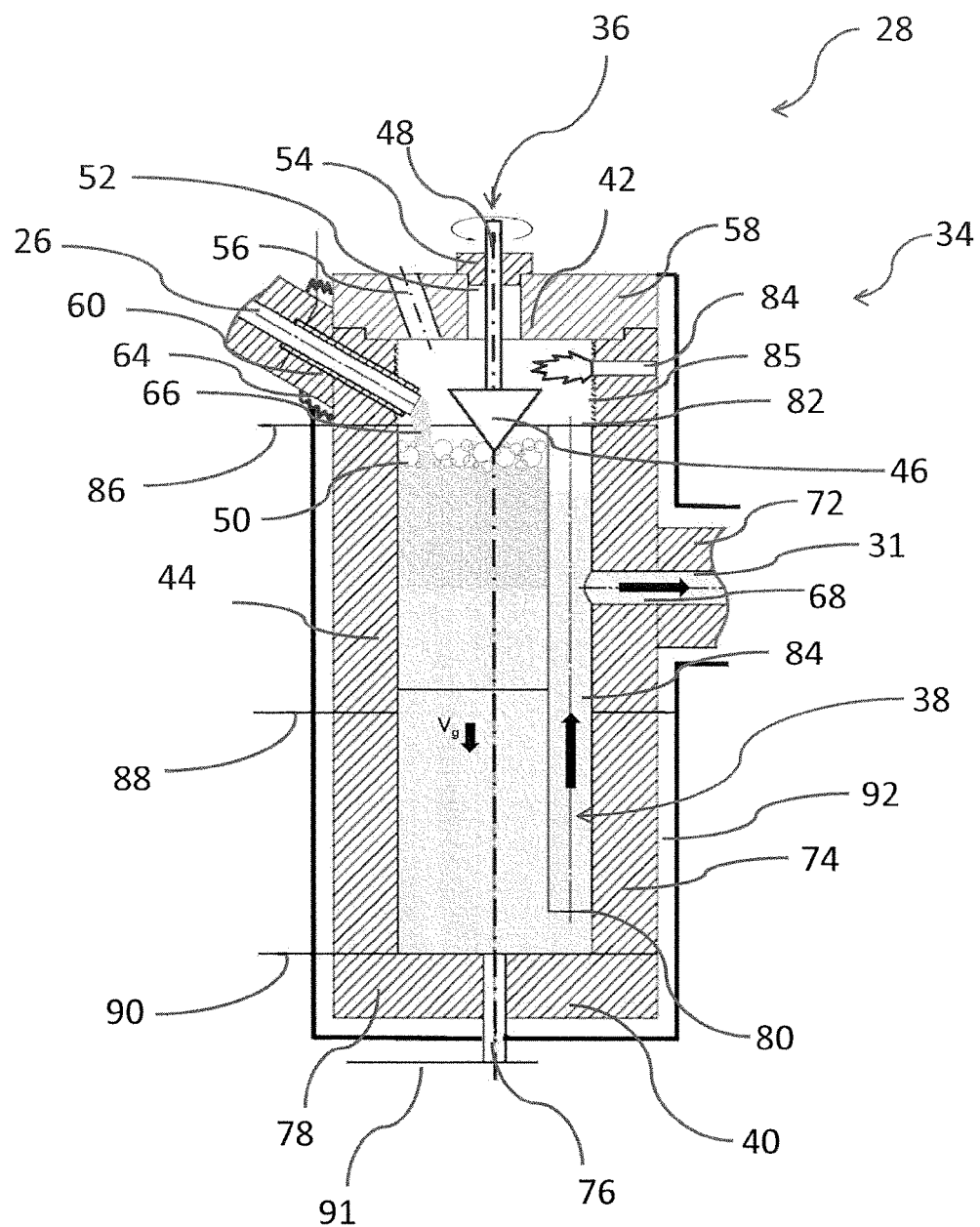
FIG. 2 is an elevated cross-sectional view of the prefiner of the present disclosure.

FIG. 2 is an elevated cross sectional view of the the prefiner 28 of the present disclosure. With reference to FIG. 2, the prefiner 28 includes a molten glass holding chamber 34, a foam breaker 36 and an exit conduit 38. The chamber 34 can include a bottom portion 40, a top portion 42, and an enclosing sidewall 44. The enclosing sidewall 44 may have a circular cross section in some embodiments or another suitable cross section.

The foam breaker 36 can include a head 46 and a stem 48 whereby, in some embodiments, the foam breaker 36 may be positioned at the top of the molten glass holding chamber 34 and engage the top opening 52 in the top portion 42 of the chamber 34. As shown in FIG. 2, the stem 48 of the foam breaker 36 may extend through the top opening 52 such that the stem 48 may be engaged to provide foam breaking movement to the foam breaker 36. The head 46 of the foam breaker 36 may be positioned within the chamber 34 to contact glass foam 50 when the chamber 34 is filled with molten glass exiting the submerged combustion melter 22 (see FIG. 1).

In the depicted embodiment of FIG. 2, a rotating cone may be used to stretch, break and reduce glass foam 50 at the free surface thereof. Of course, other foam controlling alternatives, or a combination of them, can be used in the prefiner 28 and such an example should not limit the scope of the claims appended herewith. For example, the rotating cone and other exemplary foam reducing strategies are described in U.S. Pat. No. 6,854,290, the entirety of which is incorporated by reference.

A cover 54 may also be used as part of the chamber top portion 42 to properly fix the position of the foam breaker 36 within the top opening 52, and to seal the interior of the chamber 34 from the outside atmosphere. The chamber top portion 42 may also be provided with an observation port 56 to permit a visual inspection of the interior of the chamber 34. The chamber top portion 42 may also include insulation 58 to reduce heat loss from the interior of the chamber 34.

In some embodiments, the sidewall 44 can include an inlet 60 configured to receive the melter conduit 26 delivering molten glass from the submerged combustion melter 22 to an exemplary prefiner 28. The inlet 60 may accommodate, in some embodiments, the melter conduit 26 in a non-rigid connection. Such a connection may be useful to isolate the prefiner 28 from vibrations generated within the submerged combustion melter 22.

The interface between the inlet 60 and the melter conduit 26 may also include a non-rigid enclosure 64, which maintains a non-rigid connection between the submerged combustion melter 22 and prefiner 28, and may also be configured to minimize or control the effect of the surroundings on the internal atmosphere of an exemplary prefiner 28 and/or to minimize heat losses. In the embodiment of FIG. 2, inlet 60 may be wider than the melter conduit 26 and permits the melter conduit 26 to extend to the interior of the chamber 34 such that molten glass flow 66 may pour into the chamber 34.

The chamber sidewall 44 can also include an outlet 68 configured to receive the finer conduit 31. This finer conduit 31 can serve as an exit for molten glass towards the finer 32 (FIG. 1). In some embodiments, a connection 72 to the finer 32 may be provided and insulated as shown in FIG. 2. The insulated connection 72 may be used to minimize heat loss from the system. In other embodiments, the chamber sidewall 44 may also include insulation 74 to minimize heat loss from the system.

In some non-limiting embodiments, the chamber bottom portion 40 may also include a draining tap 76 in the event the chamber 34 must be shut down and emptied. The draining tap 76 may be heated using the lower flange 90 and a tap flange 91. The draining tap 76 may also be used as a flow diverter in case a separate prefined glass stream is desired. The location of the draining tap 76 may not be limited to the center of the chamber bottom portion 40 and may even be used in the sidewall 44. Similar to the sidewall, the chamber bottom portion 40 may include insulation 78 to minimize heat loss from the system.

The exit conduit 38 may include a lower opening 80 and upper opening 82 defining a passage within the exit conduit 38. The exit conduit 38 may be in fluid communication with the outlet 68 of the sidewall 44 such that prefined molten glass enters the exit conduit 38 at the lower opening 80 before it exits the chamber 34 through the outlet 68. As shown in FIG. 2, the lower opening 80 of the exit conduit 38 may be positioned in a lower section of the chamber 34. An upper opening 82 may be positioned in an upper section of the chamber 34 above the level of glass foam 50 such that no materials enter the exit conduit 38 through the upper opening 82.

In some embodiments, the exit conduit 38 may not need low velocities such as those in the downward flow section of the prefiner 28. In the embodiment of FIG. 2, the flow of the molten glass in the exit conduit 38 can have an upward direction; however, other embodiments could include any flow direction, as long as the entry point into the exit conduit 38 occurs at the proper height below the glass free surface and such an example should not so limit the scope of the claims appended herewith.

The chamber 34 may also include a gas burner 84, or multiple gas burners, in the space above the glass foam 50. The gas burner 84, or multiple gas burners, may be used for heating the atmosphere above the glass level. Of course, other methods of heating the prefiner 28 above the glass level may be used and such an embodiment should not limit the scope of the claims appended herewith. For example, the chamber 34 sidewall 44 and top portion 42 may be electrically heated with metal windings 85.

The chamber 34 may also include upper, median and lower flanges 86, 88, 90, respectively for direct heating of the interior of the chamber 34. The upper flange 86 may be located in the upper section of the chamber 34 adjacent to the molten glass flow 66. The median flange 88 may be located in a midsection of the chamber 34 to regulate heating in the midsection of the chamber 34. The lower flange 90 may be located at the bottom of the chamber 34. In some embodiments, each of these flanges 86, 88, 90 may be independently controlled to provide the chamber 34 with a predetermined temperature gradient from top to bottom. Input for such control may be provided by thermocouples, RTDs, or the like. For example, the upper flange 86 may be set to a higher temperature than the median and lower flanges 88, 90 to provide a higher temperature zone in the upper section of the chamber 34. A higher temperature zone in the upper section of the chamber 34 may be desirable to decrease viscosity to enable greater bubble mobility within the molten glass.

The interior of the prefiner 28 may be a circular tube made of a platinum alloy. Platinum can also be used as a heating element by conducting electric energy therethrough. Of course, the interior of prefiner 28 may not be limited to platinum alloys as other materials may be used to form the interior of prefiner 28. For example, platinum-rhodium alloys may be employed such as, but not limited to, PtRh20 and PtRh30 alloys. As previously noted, although the depicted cross section of the prefiner 28 is circular, the cross section may be any other convenient geometry, as long as proper considerations are given to the glass flow.

In some embodiments, an enclosure 92 may be added to the prefiner 28. The enclosure 92 may contain a modified atmosphere that prevents hydrogen permeation. Such an enclosure with a modified atmosphere may be desirable when using platinum alloys as the material for the interior of the prefiner 28.

It will be apparent to those skilled in the art that various modifications and variations can be made without departing from the spirit and scope of the invention, which is defined by the appended claims.

The invention claimed is:

1. A glass prefiner comprising:
   a molten glass holding chamber having a top portion, a bottom portion, and an enclosing sidewall;
   a foam breaker having a head and a stein, the head configured to engage glass foam within the chamber; and
   an exit conduit having a first opening, a second opening, and an intermediate passage, the first opening positioned in a lower section of the chamber to be immersed in molten glass below the glass foam and the second opening positioned in an upper section of the chamber to be above the glass foam, the exit conduit defining a space above the second opening between the exit conduit and the top portion of the chamber;
   wherein the top portion of the chamber includes a third opening configured to accommodate the stem of the foam breaker, the stem of the foam breaker inserted in the third opening to provide foam-breaking movement to the head of the foam breaker within the chamber;
   wherein the sidewall includes an inlet configured to receive molten glass from a molten glass source and an outlet configured to discharge prefined molten glass; and
   wherein the exit conduit is in fluid communication with the outlet such that only prefined molten glass passing through the exit conduit at the first opening may be discharged through the outlet.

2. The glass prefiner of claim 1 wherein the chamber includes a heating element to heat the chamber.

3. The glass prefiner of claim 2 wherein the chamber includes a plurality of heating elements to heat the chamber and permit the creation of heating zones of differing temperatures within the chamber.

4. The glass prefiner of claim 1 wherein the chamber includes a gas burner arranged to be positioned above the glass foam.

5. The glass prefiner of claim 1 wherein the chamber includes an interior wall, the interior wall made of a platinum alloy.

6. The glass prefiner of claim 1 wherein the prefiner includes an enclosure surrounding the chamber, the enclosure configured to maintain the chamber in a controlled atmosphere.

7. The glass prefiner of claim 5 wherein the prefiner includes an enclosure surrounding the chamber, the enclosure configured to maintain the chamber in a controlled atmosphere.

8. The glass prefiner of claim 1 wherein the inlet is configured to accommodate a conduit for delivering molten glass in a non-rigid connection.

9. The glass prefiner of claim 1, wherein the exit conduit comprises a conduit wall.

10. The glass prefiner of claim 9, wherein the first opening, the second opening, and the intermediate passage are defined between the conduit wall and the sidewall.

11. The glass prefiner of claim 1, wherein the exit conduit extends along an axis that intersects the space between the second opening and the top portion of the chamber.

12. The glass prefiner of claim 11, wherein the exit conduit extends along an axis that is spaced apart from the sidewall between the second opening and the top portion.

13. A glass prefiner comprising:
   a molten glass holding chamber having a top portion, a bottom portion, and an enclosing sidewall;
   a foam breaker having a head and a stem, the head configured to engage glass foam within the chamber;
   an exit conduit having a first opening, a second opening, and an intermediate passage, the first opening positioned in a lower section of the chamber to be immersed in molten glass below the glass foam and the second opening positioned in an upper section of the chamber to be above the glass foam;
   an upper heating flange extending through the sidewall between an exterior of the chamber and an interior of the chamber; and
   a lower heating flange extending through the sidewall between the exterior of the chamber and the interior of the chamber, the lower heating flange positioned in closer proximity to the bottom portion of the chamber than the upper heating flange, the lower heating flange maintained at a lower temperature than the upper heating flange;

wherein the top portion of the chamber includes a third opening configured to accommodate the stein of the foam breaker, the stem of the foam breaker inserted in the third opening to provide foam-breaking movement to the head of the foam breaker within the chamber;

wherein the sidewall includes an inlet configured to receive molten glass from a molten glass source and an outlet configured to discharge prefined molten glass; and wherein the exit conduit is in fluid communication with the outlet such that only prefined molten glass passing through the exit conduit at the first opening may be discharged through the outlet.

* * * * *

UNITED STATES PATENT AND TRADEMARK OFFICE
CERTIFICATE OF CORRECTION

| | | |
|---|---|---|
| PATENT NO. | : 10,167,221 B2 | Page 1 of 1 |
| APPLICATION NO. | : 15/328254 | |
| DATED | : January 1, 2019 | |
| INVENTOR(S) | : Gilbert De Angelis et al. | |

It is certified that error appears in the above-identified patent and that said Letters Patent is hereby corrected as shown below:

In the Claims

In Column 5, Line 57, Claim 1, delete "stein," and insert -- stem, --, therefor.

In Column 7, Line 5, Claim 13, delete "stein" and insert -- stem --, therefor.

Signed and Sealed this
Sixth Day of August, 2019

Andrei Iancu
*Director of the United States Patent and Trademark Office*